(12) United States Patent
Wark

(10) Patent No.: US 7,121,296 B2
(45) Date of Patent: Oct. 17, 2006

(54) VARIABLE ORIFICE VALVE FOR AIR STREAM CONTAINING PARTICULATE COAL

(76) Inventor: Rickey E. Wark, 4 Watermark Way, The Woodlands, TX (US) 77381

( * ) Notice: Subject to any disclaimer, the term of this patent is extended or adjusted under 35 U.S.C. 154(b) by 0 days.

(21) Appl. No.: 11/176,540

(22) Filed: Jul. 7, 2005

(65) Prior Publication Data

US 2005/0243162 A1  Nov. 3, 2005

Related U.S. Application Data

(62) Division of application No. 10/447,740, filed on May 29, 2003, now Pat. No. 6,923,203.

(51) Int. Cl.
*G05D 7/06* (2006.01)
*F23K 3/02* (2006.01)

(52) U.S. Cl. .............................. 137/487.5; 110/101 C; 251/122; 137/375

(58) Field of Classification Search ............... 137/504, 137/487, 487.5; 251/120, 124, 294; 138/40, 138/46
See application file for complete search history.

(56) References Cited

U.S. PATENT DOCUMENTS

| | | | |
|---|---|---|---|
| 3,815,627 A | 6/1974 | Farrell et al. | |
| 4,413,646 A * | 11/1983 | Platt et al. | 137/240 |
| 4,556,157 A | 12/1985 | Shapland | |
| 4,796,651 A * | 1/1989 | Ginn et al. | 137/8 |
| 4,907,741 A * | 3/1990 | McIntyre | 239/124 |
| 4,976,377 A * | 12/1990 | Higuchi et al. | 222/55 |
| 5,741,002 A | 4/1998 | Breyer | |
| 6,009,899 A | 1/2000 | Polutnik | |
| 6,016,832 A * | 1/2000 | Vars et al. | 137/487.5 |

OTHER PUBLICATIONS

"Pulverized Coal Line Valves" brochure, Power & Industrial Services Corporation, cover and pp. 3-4.

* cited by examiner

*Primary Examiner*—Ramesh Krishnamurthy
(74) *Attorney, Agent, or Firm*—Young & Basile, P.C.

(57) ABSTRACT

A variable orifice valve for balancing the flow of particulate coal in an air stream relative to other parallel conduits. The valve comprises a section of conduit which changes in area along its flow axis and a variable position valve element mounted within the conduit section. The valve element has a shape which proximates that of the conduit section and is movable axially to vary the annular area of the flow path around the valve element. There is no valve seat and, therefore, the valve is always open to some degree.

9 Claims, 5 Drawing Sheets

VARIABLE ORIFICE VALVE FOR AIR STREAM CONTAINING PARTICULATE COAL

CROSS-REFERENCE TO RELATED APPLICATIONS

This application is a divisional of patent application Ser. No. 10/477,740 filed on May 29, 2003, now U.S. Pat. No. 6,923,203 now pending which is incorporated by reference herein in its entirety.

FIELD OF THE INVENTION

This invention relates to valves for controlling the flow of abrasive fluid mixtures such as an air stream containing particulate coal.

BACKGROUND OF THE INVENTION

A major technical problem confronted by coal-fired power-generating installations such as electric utility plants is balancing the flow rates of multiple airstreams containing particulate coal. This problem arises in the design of flow paths between a coal pulverizer and a combustion chamber or a "firebox" having spaced peripheral injection points. The coal laden airstreams tend to follow general hydraulic flow principles in that they tend to choose the path of least resistance. Accordingly, parallel flow paths of different lengths with a common entry will often exhibit substantially different flow rates resulting in different fuel feed rates and an asymmetrical fire ball in the combustion chamber.

The problem is typically confronted by the use of ring-like flow restrictors in the various parallel paths. Such restrictors are placed in the flow paths to reduce the interior diameter in the shorter, less-resistant paths. However, a restrictor size which is correct for one flow rate may not work for a different flow rate. Thus, variable orifice devices such as the gate valve described in the U.S. Pat. No. 6,009,899 have been developed. Gate valves present their own problems; for one, they tend to include structures which can be extended orthogonally across the flow path. As such, they create turbulence and eddy currents and are subject to rapid wear.

SUMMARY OF THE INVENTION

The present invention provides an improved flow rate valve for regulating and/or balancing the flow of particulate coal carried by one or more of several parallel airstreams. As opposed to a flow restrictor or gate valve which is extended orthogonally into and/or across the air stream, the present valve is constructed by placing a wear-resistant valve element of streamlined shape essentially centrally in an insert placed into a length of flow conduit wherein the insert has an axially varying cross section; e.g., a conical or tapered section. There is further provided a mechanism to move the valve element axially in the insert between a first position where the area between the element and the inner wall of the insert is a minimum.

In one embodiment, axial movement of the valve element is effected by energizing and de-energizing an electric motor which winds and unwinds a cable extending into the interior of the insert and connected to the top of the valve element. In this embodiment the valve element is preferably mounted on slides which are constructed of suitable materials to withstand the abrasive action of the particulate coal/air flow. An indicator is optionally provided to show valve element position.

In another embodiment the invention includes means for sensing a parameter such as a pressure differential between axially spaced points in the air stream and automatically effecting movement of the valve element to produce a desired value of the measured parameter; e.g., a preselected pressure differential.

In both embodiments the streamlined valve element is preferably made of an abrasion resistant material such as steel, alloys of steel, aluminum oxide, tungsten carbide, silicone carbide and the like. The preferred shape of the streamlined valve element is one having conically tapered leading and trailing surfaces of essentially mirror image shape; i.e., a shape resembling a football. The element moves axially within but does not touch or "seat" on the conduit inner surface or any extension thereof.

Other applications and implementations of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATIVE EMBODIMENT

Figure 1:
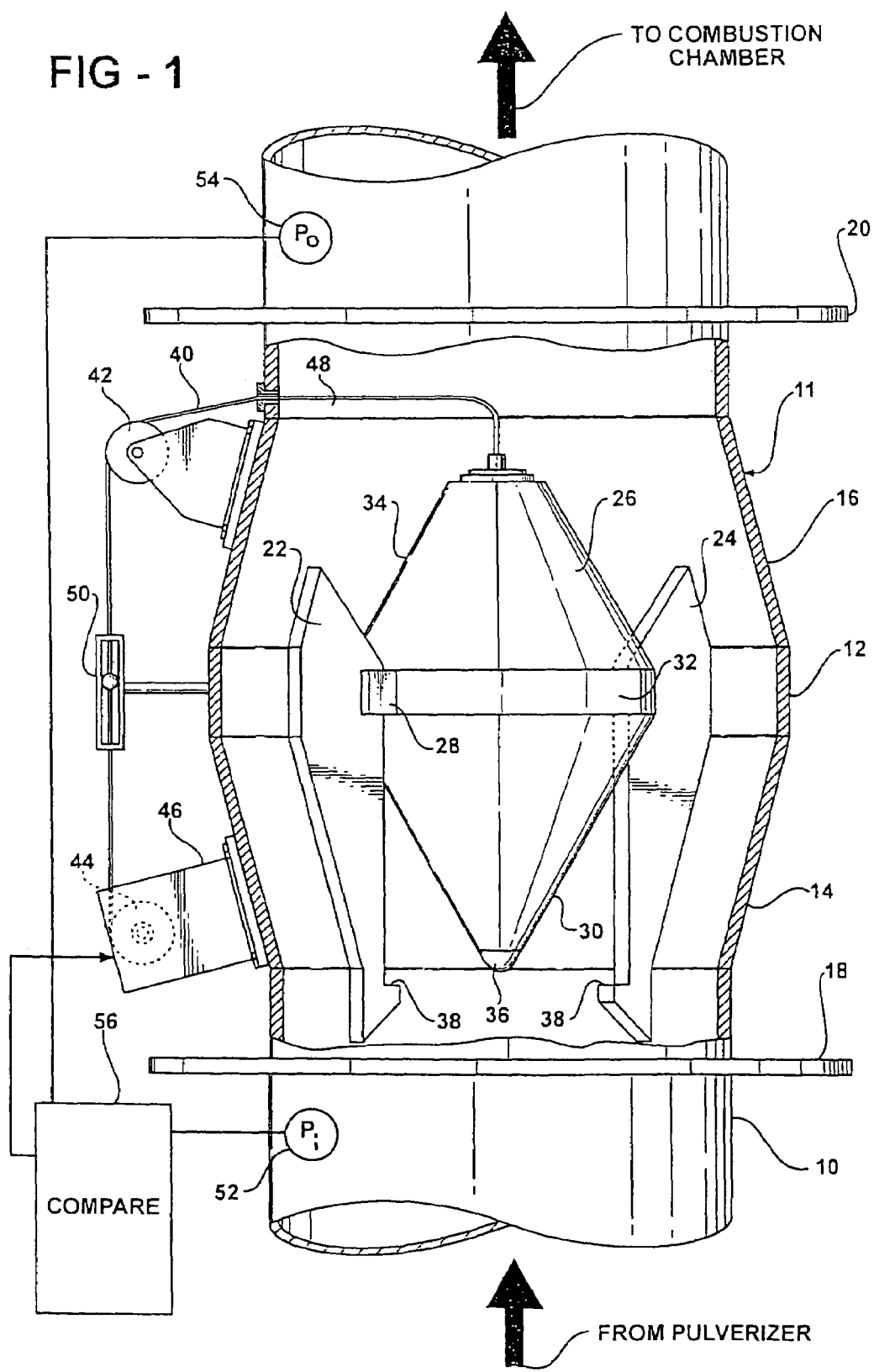
FIG. 1 is a cutaway view of a valve embodying the invention in a conduit for particulate coal.

Referring to FIG. 1, there is shown a large metal conduit 10 for a mixture of air and particulate coal, the flow direction being vertically upward as seen in the drawing. Located in the conduit 10 and continuous therewith is an insert 11 of varying cross-section including an annular section 12 of maximum diameter, a tapered frusto-conical lead-in section 14 and a frusto-conical exit section 16. The conduit insert 11 is joined to the conduit 10 by welded or bolted flanged joints 18 and 20. The various sections of the conduit insert are all made of a wear resistant material such as high chromium steel which sections can be conveniently welded together to form a relatively smooth seamless interior surface. The diameter of annular section 12 is substantially larger than the diameter of the conduit 10.

Opposed vertical steel ribs 22 and 24 are welded within the interior of the insert 11 to serve as supports and guides for a streamlined valve element 26 having a pair of opposed slides 28 straddling the interior edges of the ribs 22 and 24 to provide guidance associated with the vertical displacement of the valve element along the axis of the insert 11. The shape of the valve element 26 generally parallels the shape of the insert 11; i.e., the element 26 exhibits a tapered lower section 30, an annular central section 32 and a conical or tapered upper section 34 which is essentially the mirror image of the lower conical section 30 giving the element 26 the overall shape of a football. A tungsten carbide tip 36 is welded to the lower lead end of the element 26 for wear resistance. Mechanical stops 38 are formed on the inside lower edges of the ribs 22 and 24 to coact with the slides 28 to limit the extent of downward displacement of the element 26 relative to the conduit insert 11.

It will be seen in FIG. 1 that there is no "seat" for the valve element 26. In the full open position shown in FIGS. 1 and 2, the annular area around the element 26 is approximately equal to the cross-sectional area of conduit 10. In the full closed position shown in FIG. 3, the annular flow area is reduced to the extent the designer deems necessary; e.g., 20–50% or more.

Vertical movement of the valve element 26 is effected in this embodiment by means of a cable 40 which is attached to the top of the element 26 by suitable means and which extends through the sidewall of the conduit 10 to pass over a sheave 42 to the winding reel 44 of a motor driven capstan 46 to wind up and unwind the cable 40 as desired to locate the valve element in the proper axial position within the conduit insert 11. A bar 48 is disposed in the upper portion of the conduit to protect the cable 40 against wear. An indicator 50 is mounted to the outside of the central section 12 of the insert to provide visual indication of the position of the cable 40 as a reflection of the position of the valve element 26 along its axial travel.

As hereinafter explained with reference to FIGS. 2 through 5, the valve element 26 can be lowered and raised to change the effective area available for the air stream and particulate coal to flow through the conduit 10 thereby to balance said flow with the flow of other parallel conduits used to feed fuel to a combustion chamber in, for example, an electrical power generating plant. Push button switches and the like can be provided for operating the motor driven capstan 46 to achieve the appropriate valve position. In addition, valve position can be automatically regulated in accordance with a measured parameter.

To that end, a first pressure sensor 52 is suitably mounted within the interior of the lower portion of the conduit 10 to measure pressure $P_i$. A second sensor 54 is located in the upper portion of the conduit 10 to measure the outlet pressure $P_O$. Electrical signals representing the two pressures are connected to respective inputs of the comparator 56 in the form, for example, of a microprocessor. The comparator 56 generates an electrical output which is connected to the motor driven capstan 46 to wind up or unwind cable in a direction which tends to reduce the error signal produced by the comparator 56 to zero. In this respect a feedback system is provided to position the valve element 26 along its path of axial travel at the optimum location to achieve the desired pressure difference $P_i - P_O$.

The valve element is preferably made of a wear resistant material such as steel, an alloy of steel, aluminum oxide, tungsten carbide and/or silicone carbide. Other materials may also be used according to the desired life of the valve element and the abrasiveness of the mixture flowing over it. This number is compared to a reference quantity variably inserted or programmed into device 56 and the difference used as an "error" signal to drive device 46 in a direction which reduces the "error" signal to zero.

Figure 2:
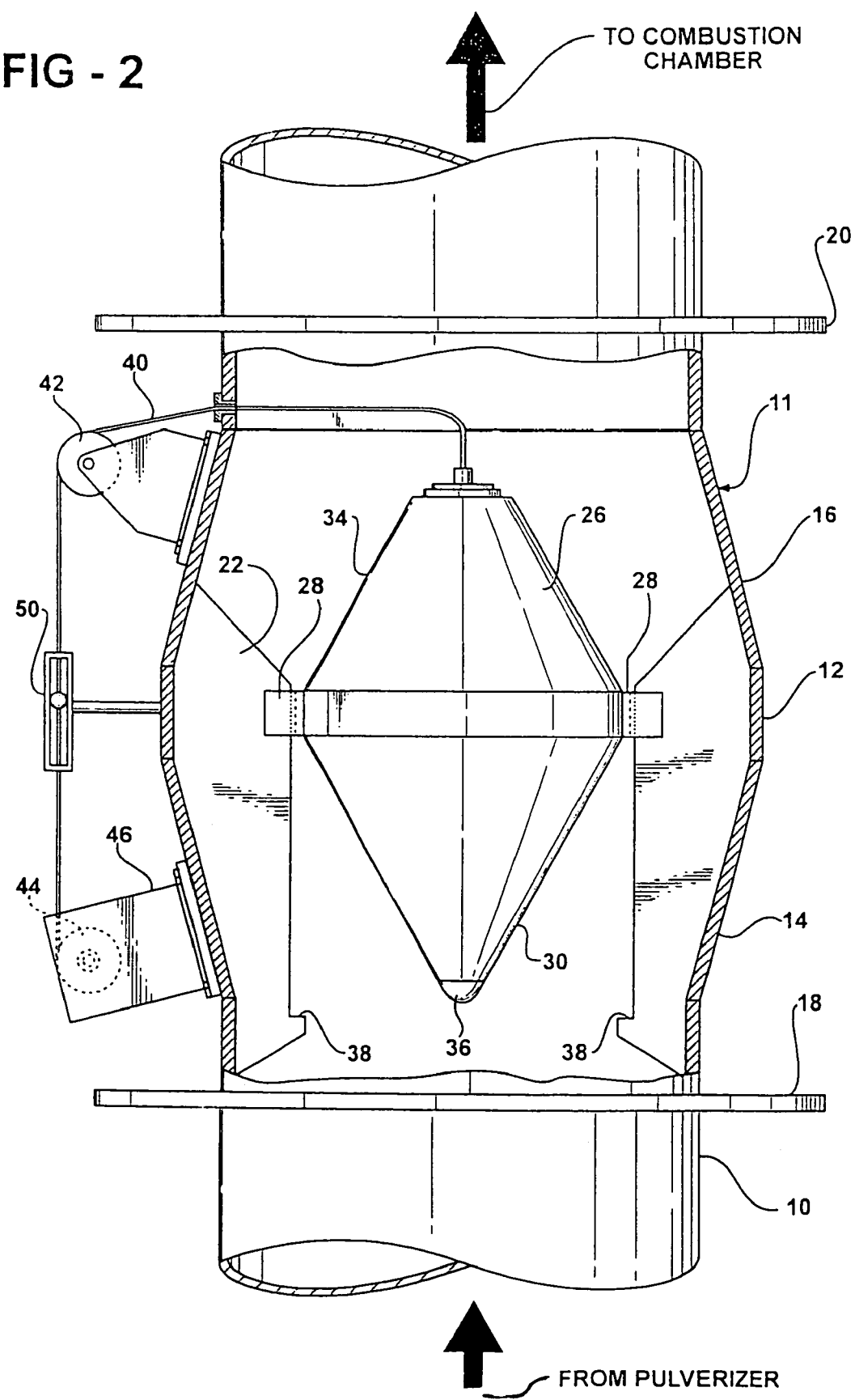
FIG. 2 is a side view of the valve, partly in section, in a maximum flow condition.

Referring now to FIG. 2, the valve is illustrated in the fully opened or maximum flow position. In this condition the guides 28 are located within the maximum diameter central section 12 of the conduit insert 11; i.e., the maximum diameter of the valve element 16 is axially collocated with the maximum diameter of the conduit insert 11. As shown in FIG. 2 this produces an annular area between the valve element 26 and the interior surface of the conduit insert 11 which approximates the cross-sectional area of the conduit 10.

Figure 3:
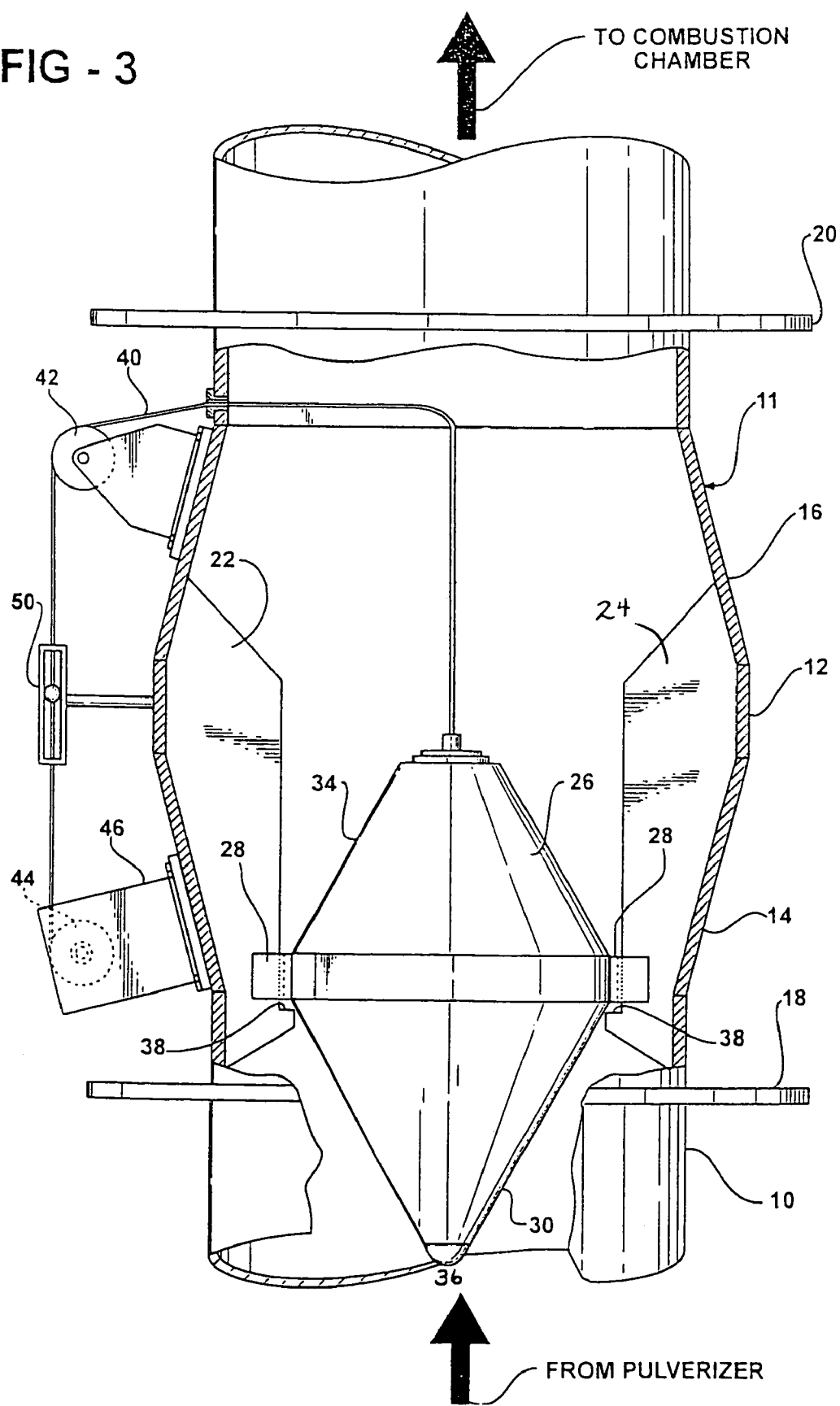
FIG. 3 is a view of the valve in a minimum flow condition.
Figure 4:
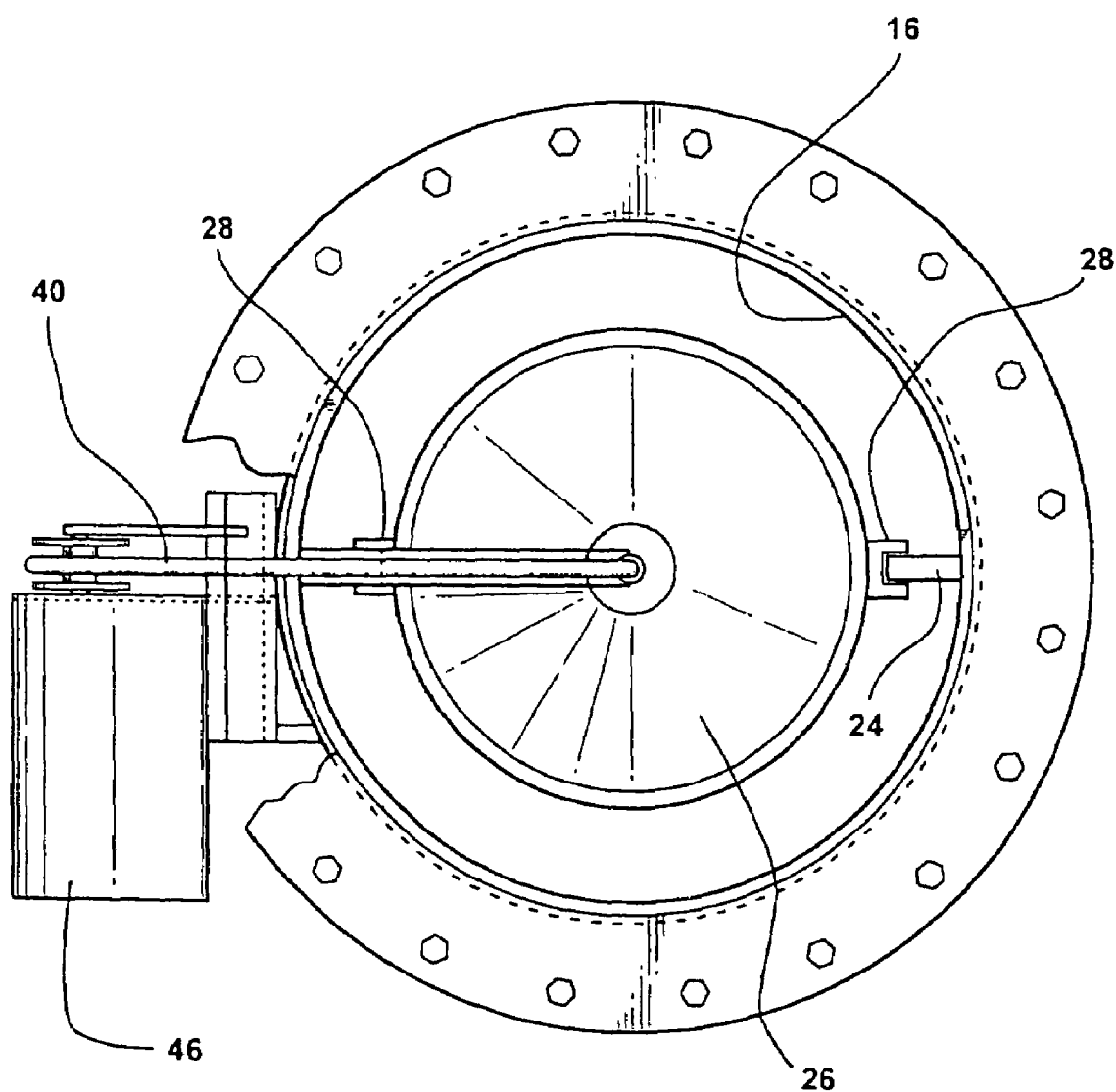
FIG. 4 is a plan view of the valve.

Referring to FIG. 3, the valve element 26 is shown in its lowermost position wherein the annular section 12 of the valve element 26 is within the minimum diameter portion of the insert 11. The guides 28 are disposed on the ribs 22, 24 at or near the mechanical stops 38. This is achieved by extending the cable 40 by unwinding cable from the motor driven capstan 46. The result is to minimize the annular area between the belt line 32 of the valve element 26 and the interior surface of the conduit insert 11 to provide the maximum desired degree of restriction to flow of the coal air mixture.

INDUSTRIAL APPLICABILITY

Figure 5:
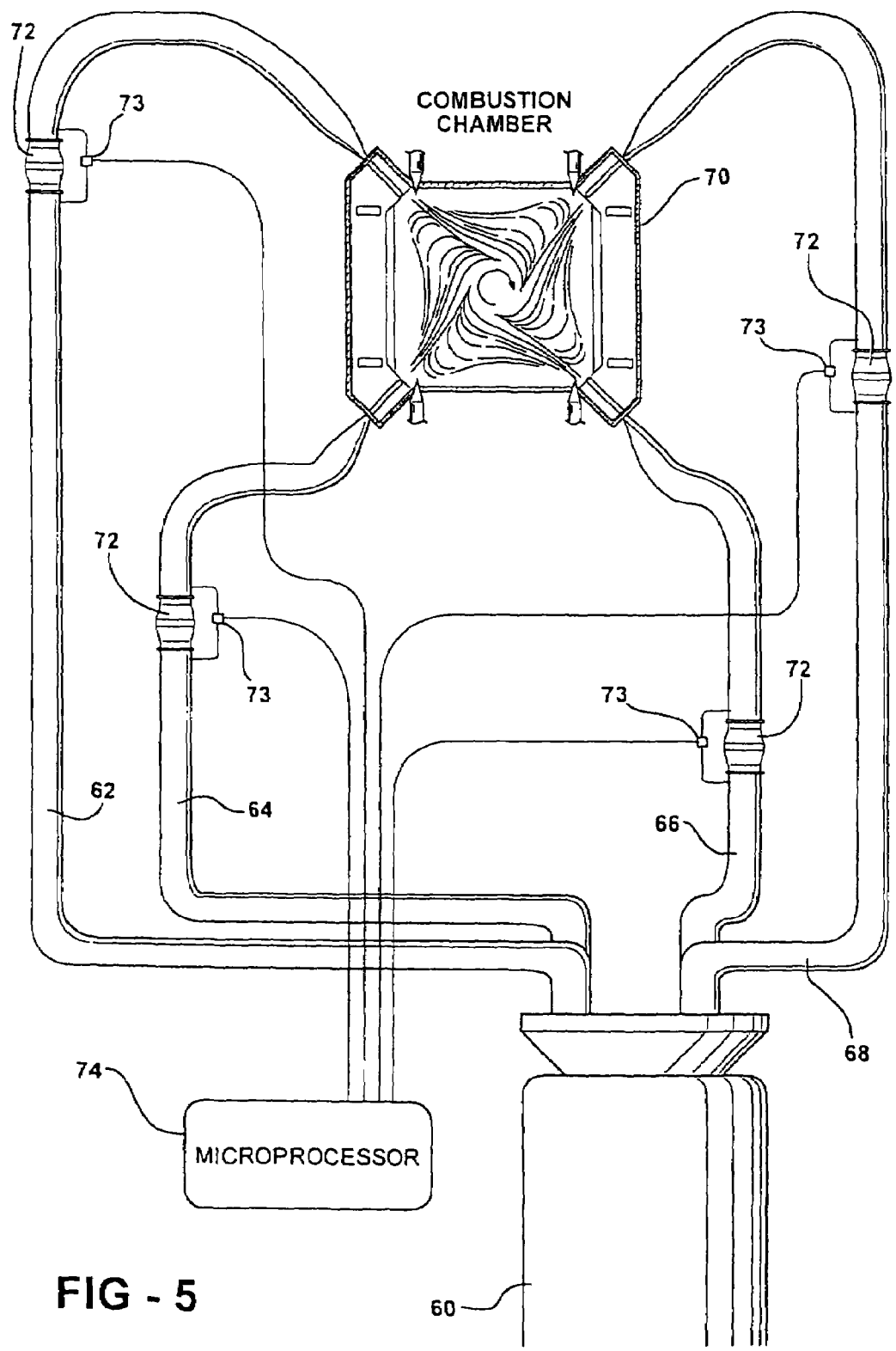
FIG. 5 is a schematic diagram of an industrial application of the valve.

Referring now to FIG. 5, there is shown a pulverized coal fired heating system comprising a conventional coal pulverizer 60 having four output air flow conduits 62, 64, 66 and 68 connected to the four corners of a tangentially fed combustion chamber or firebox 70. Because the conduits 62, 64, 66 and 68 are effectively all of different lengths, variable orifice valves 72 are located in each of the conduits to precisely control and regulate the flow of the coal air mixture therethrough so as to balance the flow of combustible fuel to the chamber 70. Each of the variable orifice valves 72 corresponds in structure to the apparatus shown in FIG. 1 and includes a differential pressure measuring system 73 with an output connected to an input of the microprocessor 74. The system is programmed to produce essentially equal pressure differential readings and essentially equal flow rates in all of the conduits 62, 64, 66 and 68.

While four variable orifice valves are illustrated in the four conduit system of FIG. 5, operable systems can be provided with fewer than four variable orifice valves; i.e., it may not be necessary to place a variable orifice valve in every conduit.

While the invention has been described with reference to a mechanical cable system for varying the position of the valve element 26 within the conduit insert 11, other mechanisms including linear motors and magnetic suspension systems may be employed. Further, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A valve for controlling the flow of particulate coal cried by an air stream moving along the axis of a conduit of known cross-sectional area comprising:

an insert of tapered cylindrical shape having an entry end adapted to be co-axially connected to said conduit, having a cross-sectional area at said entry end substantially equal to that of the conduit and having a midsection of a diameter and cross-sectional area which is substantially greater than that of the entry end;

a valve element of tapered shape and of a maximum diameter which is smaller than that of said conduit and said entry end mounted in the insert for movement along said axis between a first unseated position wherein the cross-sectional area between the maximum diameter of said element and the mid-section of said insert is approximately equal to the cross-sectional area of said conduit and a second unseated position wherein the area between the maximum diameter of said element and corresponding diameter of said insert is substantially less tan the cross-sectional area of said conduit; and a mechanical system connected between the conduit and element for effecting axial movement of said element between said first and second position.

2. A valve as defined in claim 1 further including slide means mounted in said insert and attached to said element for providing axial sliding movement of said element relative to said insert.

3. A valve as defined in claim 1 further including means for indicating the axial position of the valve element.

4. A valve as defined in claim 1 wherein said element is made of a wear resistant material.

5. A valve as defined in claim 1 wherein at least a portion of said element is made of a material selected from the group comprising hardened steel, a hardened alloy of steel, aluminum oxide, tungsten carbide, and silicone carbide.

6. A valve as defined in claim 1 further including means for sensing a flow parameter and automatically effecting axially movement of said element between said first and second positions in response to said parameter.

7. A valve as defined in claim 1 further including means for sensing a pressure differential along the axis of said insert and producing a signal representative thereof; said signal being connected to said means for effecting axial movement to effectuate control thereof.

8. A valve as defined in claim 1 wherein said valve element exhibits a conical lead surface shape, a mirror image conical tailing surface shape and a central circumferential band of maximum diameter relative to said leading and trailing conical surfaces;

said maximum diameter being less than the diameter of said entry end.

9. A valve as defined in claim 1 wherein said mechanical system comprises a cable connected to said element and extending to a point exterior of said flow conduit and power means connected to wind and unwind said cable.

* * * * *